United States Patent [19]

Rado

[11] 4,373,501
[45] Feb. 15, 1983

[54] FUEL METERING SYSTEM FOR AN INTERNAL COMBUSTION ENGINE

[75] Inventor: William G. Rado, Ann Arbor, Mich.

[73] Assignee: Ford Motor Company, Dearborn, Mich.

[21] Appl. No.: 303,273

[22] Filed: Sep. 17, 1981

[51] Int. Cl.³ .............................................. F02D 9/02
[52] U.S. Cl. .................................................... 123/589
[58] Field of Search ................. 123/340, 327, 585–589

[56] References Cited

U.S. PATENT DOCUMENTS

| | | | |
|---|---|---|---|
| 4,020,813 | 5/1977 | Hattori et al. | 123/124 B |
| 4,052,968 | 10/1977 | Hattori et al. | 123/119 EC |
| 4,075,835 | 2/1978 | Hattori et al. | 123/119 EC |
| 4,077,207 | 3/1978 | Hattori et al. | 123/119 EC |
| 4,079,711 | 3/1978 | Hattori et al. | 123/119 EC |
| 4,084,558 | 4/1978 | Hattori et al. | 123/97 B |
| 4,084,560 | 4/1978 | Hattori et al. | 123/119 EC |
| 4,094,273 | 6/1978 | Hattori et al. | 123/32 EE |
| 4,106,451 | 8/1978 | Hattori et al. | 123/119 EC |
| 4,119,074 | 10/1978 | Masaki et al. | 123/124 B |
| 4,121,546 | 10/1978 | Hattori et al. | 123/119 EC |
| 4,129,105 | 12/1978 | Ito et al. | 123/119 EC |
| 4,130,095 | 12/1978 | Bowler et al. | 60/285 |
| 4,136,651 | 1/1979 | Hattori et al. | 123/119 EC |
| 4,140,093 | 2/1979 | Hattori et al. | 123/119 EC |
| 4,240,145 | 12/1980 | Yano et al. | 123/587 X |
| 4,280,471 | 7/1981 | Masaki | 123/585 X |
| 4,290,107 | 9/1981 | Suda et al. | 123/589 X |

Primary Examiner—William A. Cuchlinski, Jr.
Attorney, Agent, or Firm—Peter Abolins; Clifford L. Sadler

[57] ABSTRACT

This specification discloses a method for controlling the air fuel ratio for an internal combustion engine having an air supply passage by prepositioning an auxiliary air supply passage to counteract a predicted transient. A stored look-up table indicates the amount of change in the auxiliary air supply passage upon detection of a transient. After the detected transient, the air flow in the auxiliary air supply is adjusted to a value so as to be able to provide a rapid change in magnitude to compensate the next predicted transient. The look-up table is adaptively updated to take into account engine operating conditions.

2 Claims, 8 Drawing Figures

FUEL METERING SYSTEM FOR AN INTERNAL COMBUSTION ENGINE

BACKGROUND OF THE INVENTION

1. Field of the Invention

This invention relates to a fuel metering system having improved ability to handle transient fuel metering modes of operation. More particularly, it relates to a fuel metering system for an internal combustion engine wherein the fuel control system of the engine is better enabled, as compared to the prior art, to handle the transient conditions that occur during engine accelerations, decelerations (negative acceleration) and other conditions that cause fluctuations to occur on a temporary basis in the flow of fuel from the engine's primary fuel metering apparatus to its combustion chamber or chambers.

2. Prior Art

In internal combustion engines, the rate at which fuel is metered to the engine varies during engine operation. Changes in engine load cause the engine's fuel metering apparatus to increase or to decrease the rate at which fuel is metered to the engine. As a result, the engine must change from a first state, where the engine operation and fuel flow rate is quite stable to a second state, where these conditions again become stable. The conditions in between the stable states are of a transient character in that the rate of fuel flow varies continuously and can produce undesirable air/fuel ratios. For example, with carburetion or other central location of the fuel metering apparatus, there is an intake manifold passage that the vaporized or atomized fuel must traverse in order to reach the engine's combustion chamber or chambers. At a given engine load, prior art fuel control systems under transient engine operation are unable to maintain precise air/fuel ratios until the conditions in the engine's intake passages have stabilized. Sudden accelerations create a need to deposit liquid fuel on the walls of the intake passages (wall wetting), while sudden decelerations result in the evaporation of the previously deposited fuel. The reason for this has to do with the changing vapor pressures. The higher the vapor pressure, the more the fuel tends to accumulate on the walls of the intake passages. Vapor pressure is a partial pressure, and the major contributor to pressure in the intake pressure is air. The air pressure in the intake passages in general is below atmospheric, unless the usual throttle valve is fully open, during engine operation.

While the wall-wetting changes, the amount of fuel metered by the fuel metering apparatus on the engine is not the amount of fuel that actually reaches the engine's combustion chambers within the charge transport time (air/fuel delivery time) applicable to the particular engine speed and load conditions at the time. The engine speed and load under stable engine operating conditions are the factors primarily determinative of the transport time of the air/fuel mixture from the fuel metering apparatus, such as a conventional carburetion system, to the engine's respective combustion chambers.

When the engine is cold, the amount of liquid fuel deposited on the intake passage surfaces is greater than it is when the engine is warm. This is because the tendency to vaporize fuel is greater at higher temperatures, and also because the fuel condenses more easily at the lower temperatures. Also, at lower intake air or fuel temperatures, the fuel metering device or system employed may not be as effective in thoroughly mixing the air and fuel inducted into the engine. For these reasons, it conventionally has been necessary to employ fuel enrichment devices and techniques (the general equivalent of the choke function conventionally employed on spark ignition engines) in order to compensate for operation at lower temperatures. Unfortunately, the fuel enrichment that occurs results in increased hydrocarbon engine exhaust emissions and this has necessitated the use of elaborate choke control devices and systems to reduce the hydrocarbon emissions as much and as rapidly as possible. Such reduction of the hydrocarbon emissions has impeded or reduced the performance of the associated engines during the warm-up period.

SUMMARY OF THE INVENTION

In accordance with the invention, an improved fuel metering system is provided that is particularly suitable for use with a spark ignition internal combustion engine. The principles of the improvement may, however, be extended to other engine designs, such as external combustion and turbine. Each of these and other engine types requires an air/fuel mixture and may need the transient control provided by the invention.

The improved fuel control system of the invention is designed to take into account the variations that occur in the quantity of fuel that is deposited in the liquid state in the intake passage or passages of an engine. Thus the fuel control system facilitates transitions between two steady state operating conditions. The air/fuel ratio of the mixture in the intake passages varies depending upon the initial metering of fuel in proportion to the incoming air and also as a function of the net transfer of fuel from the surfaces of the intake passage to the inducted air/fuel mixture or vice versa. The incoming air, after being mixed with fuel at some point or points in the intake passage, flows into the engine's combustion chambers. Liquid fuel on the walls of the combustion chambers may be included in the net transfer.

In accordance with the invention, an improved fuel metering system for an engine having an intake passage comprises fuel metering apparatus and means associated with the fuel metering apparatus for taking into account the rates of deposition and removal of liquid fuel on or from the surfaces of the engine's intake passages. The liquid fuel on the walls of the intake passage is transferred into and removed from the air/fuel mixture that flows through the intake passages into the combustion chambers. This transfer and removal occurs at a rate which varies both locally within the passage and also on an overall basis. The variations of rate are a function of engine speed, load on the engine, engine and intake air and fuel temperatures, and some other vehicle-to-vehicle variations.

This invention teaches controlling the air fuel ratio for an internal combustion engine having an air supply passage by providing an auxiliary air supply passage and regulating air flow through the auxiliary air supply passage so it can be adjusted to counteract a predicted transient. The method includes generating a stored look-up table to govern the amount of change in the auxiliary air supply passage upon detection of a transient. After a transient is detected, the amount of air flow in the auxiliary air supply passage is altered as a function of the look-up table. As the transient passes, the air flow is adjusted in the auxiliary air supply passage to a value suitable for compensating for the next predicted transient. Finally, the method includes adaptively updating the look up table to take into account engine operating conditions. The use of air control is advantageous compared to the control of the fuel flow because of increased speed of response offered by the auxiliary air supply passage.

DETAILED DESCRIPTION OF THE INVENTION

Figure 1:
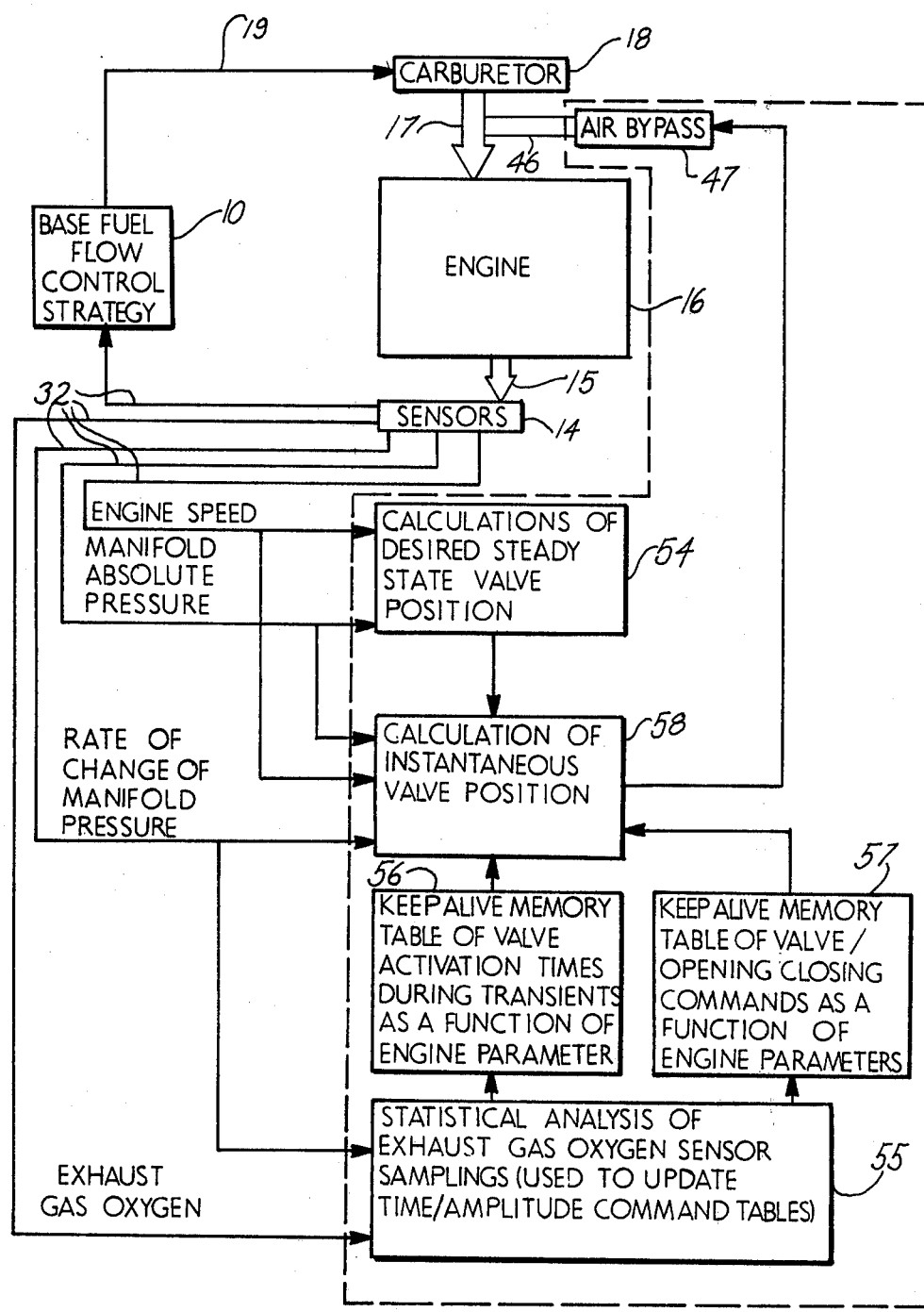
FIG. 1 is a schematic block diagram of a basic fuel control system and a transient compensation system that is used to modify as necessary the computer-calculated air fuel ratio determined by the basic system.
Figure 3:
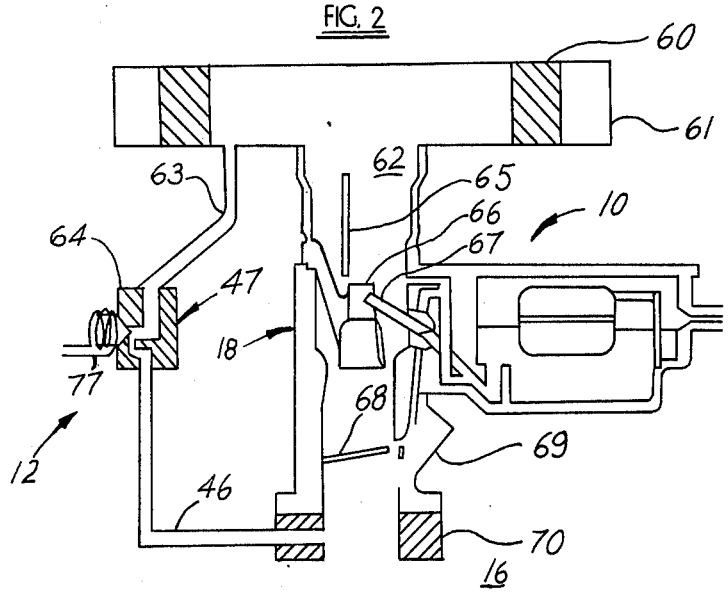
FIG. 3 is a simplified schematic diagram of an apparatus for carrying out the process indicated by FIG. 1 and includes an air bypass solenoid valve in parallel with the main air path.

With reference now to the drawings, there is shown in FIGS. 1 and 3, a basic fuel metering system 10 and a transient compensation fuel metering system 12. The basic fuel metering system has an engine 16 that produces certain operational conditions that are sensed via an engine sensor system 14, as is indicated by an arrow 15. With sensor system 14 connected by electrical leads 32, which may be in the form of a data bus for transmitting digital information, the engine operating conditions may be used in the computer calculation of the rate at which it is desired that fuel be metered to the engine 16 at a particular instant in time. This rate is calculated by the basic fuel metering system 10. Fuel is supplied to the engine with the use of a fuel system 18 that delivers fuel to the engine, as indicated by an arrow 17, in response to a suitable signal appearing on an electrical or mechanical path 19.

The basic fuel metering system 10 can include a digital computer of the type employed in the fuel metering system described in commonly assigned U.S. Pat. No. 3,969,614 to Moyer et al to provide a desired air/fuel ratio. For fuel injected systems, a mass air flow meter or other device may be used to determine directly the mass air flow. The appropriate fuel injection commands are to be generated based on the mass air flow and using an instantaneous indication of exhaust gas oxygen concentration. For carbureted engines, in a similar manner a pulsewidth modulated solenoid actuation signal can be generated to cause an A/F ratio change in response to an exhaust gas oxygen concentration sensor signal.

The transient fuel metering compensation system 12 is intended to modify the basic rate of fuel metering calculated by the digital computer. The compensation takes into account the rate at which fuel is removed from or added to the liquid residing on the surfaces of the engine's intake passages.

Referring to FIG. 3, fuel system 18 may be a conventional carburetor. The air fuel ratio applied to engine 16 is determined by fuel system 18 using a a signal on line 19 and the air flow provided on line 46 which comes from transient control system 12.

The fuel flow supplied by the basic fuel control system 10 in response to an instantaneous EGO indication or action of air flow, is calculated as previously described. The additional modulation provided by the air flow on line 46 is accomplished separately in transient air fuel ratio control system 12. Modulation of an air bypass valve 47 controlling air flow on line 46 takes into account the equilibrium intake surface fuel discussed further below.

Transient air/fuel ratio control system 12 provides inputs 32 representing engine speed and manifold absolute pressure to blocks 54 and 58. Inputs 32 also provide the time rate of change of manifold absolute pressure to blocks 58 and 55. Input 32 also provides to block 55 information for determining air fuel ratio from the exhaust gas oxygen sensor. Block 54 calculates a desired steady state air bypass valve position. Block 55 provides for a statistical analysis of exhaust gas oxygen sensor samplings used to update time (FIG. 6B) and amplitude (FIG. 6A) command tables. Block 56 contains the keep-alive memory tables of valve actuation times during transients as a function of engine parameters. The output of block 55 is supplied to a block 57 which provides the keep-alive memory table of the valve opening and closing commands as a function of engine parameters. The outputs of block 54, 56 and 57, are supplied to a block 58 for calculation of the instantaneous valve position. The output of block 58 is supplied to air bypass valve 47 for setting the valve position thus controlling air flow in line 46.

Referring to FIG. 3, a vehicle air/fuel ratio control system includes basic air/fuel control system 10 and transient air/fuel ratio system 12. An air cleaner element 60 within an air cleaner housing 61 supplies air to primary path 62 and transient control path 63 which includes a solenoid valve 64 coupled to valve actuator 77. Primary path 62 includes a choke 65 positioned adjacent the venturi section 66 which is adjacent main fuel injection nozzle 67. A throttle 68 is positioned adjacent an idle control circuit 69. In operation, the air coming through solenoid valve 64 joins the main air fuel mixture at an air bypass entry spacer 70 located downstream of throttle 68.

Figure 2:
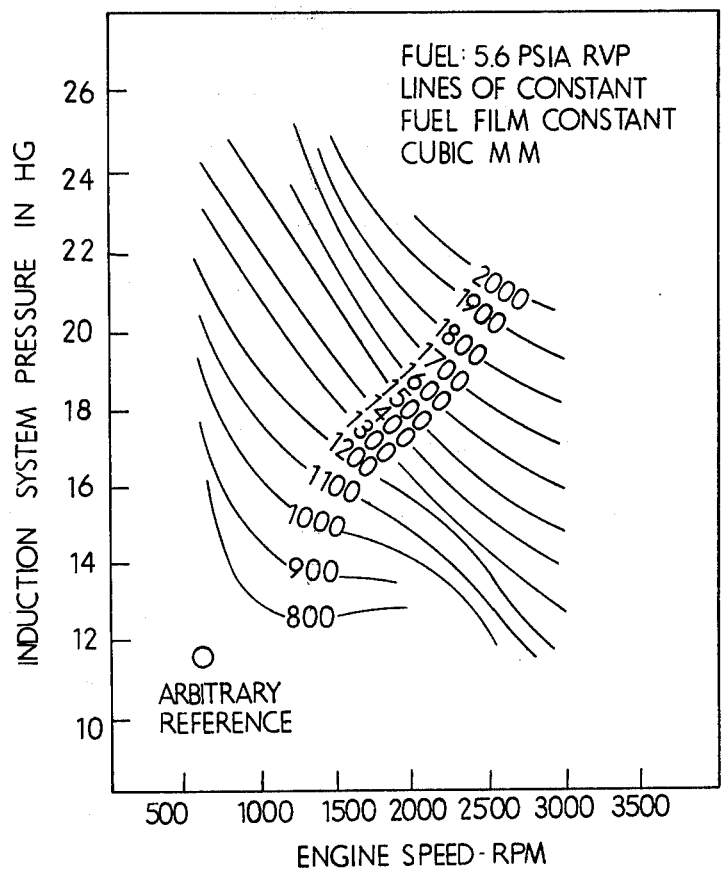
FIG. 2 is a graph of constant fuel film quantity on axes of intake manifold absolute pressure of an internal combustion engine and engine speed.

Calculation of the magnitude of the transient air fuel ratio compensation is initially based on a table of values for the equilibrium intake surface fuel (EISF) expressed as a function of one or more engine operating parameters, such as engine speed and engine load. In FIG. 2, EISF is related to intake manifold absolute pressure, a quantity that is closely related to the load on the engine. Other parameters indicative of intake air or mixture flow rate or indicative of engine torque also may be used. The EISF curves indicate that different engine power output requirements can occur at the same engine speed. In a vehicle application of an engine, this might correspond to a change from operation of the vehicle on level ground to operation on an upward incline with increased throttle opening to maintain engine speed. In such situation, the engine speed would remain substantially constant if the throttle valve (conventionally used on the engine to control airflow and power output) were to be opened to increase the engine's power output. Opening of the throttle causes the intake manifold absolute pressure (MAP) to increase and thus, engine operation shifts to a higher intake manifold absolute pressure.

The intake surface fuel at equilibrium engine operation is not changing and can be ignored. During changes or transients occurring in engine operation, however, accurate air fuel ratio control requires that allowance be made for the contribution of the inducted air/fuel mixture to the quantity of liquid fuel residing on the intake passage surfaces or the contribution of fuel to the air/fuel mixture from the intake surface deposits. The fuel leaving the intake surfaces becomes an aerosol or vapor or gas and mixes with the air and fuel moving along the intake passage. This intake surface fuel is added to the received quantity of fuel as determined by the current air fuel ratio setting. On the other hand, gaseous fuel that is deposited on the intake passage surfaces undergoes a change in state and subtracts from the quantity of fuel that actually reaches the engine's combustion chamber.

When air is added to the air/fuel mixture through valve 64 it is in addition to that flowing through port 62 which is calculated in block 10 of FIG. 1. When the air flow supplied the main port 62 is the same as the amount needed to achieve the desired air fuel ratio, the transient air fuel ratio control system 12 is not providing any transient compensation. The air/fuel ratio of the air/fuel mixture inducted into engine 16 under transient conditions is a combination of the main air flow and the quantity of air obtained through solenoid valve 64.

Figure 4:
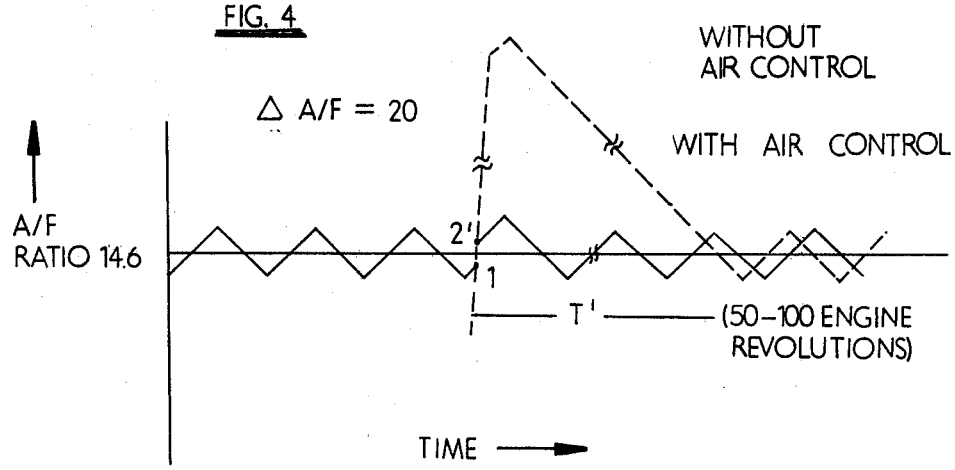
FIG. 4 is a graphical representation of time versus variations in the air fuel ratio controlled by an embodiment of this invention contrasted with variation in air fuel ratio controlled without an embodiment of this invention.

Referring to FIG. 4, the solid zig zag line along the time axis indicates the magnitude of the air fuel ratio as controlled in accordance with an embodiment of this invention. Closed loop operation uses a feedback signal provided by the output of an exhaust gas oxygen sensor to maintain stoichiometry on an average basis. The air fuel ratio is correcting itself about a stoichiometric mean as it approaches point 1. At point 1, a transient occurs so that there is an instantaneous error and the air fuel ratio deviates from stoichiometry.

The dotted line beginning at point 2 indicates the result of an engine operating condition transient upon the air fuel ratio of a system operating without an air bypass in accordance with this invention. Correction of the air/fuel ratio from point 2 to stoichiometry occurs at the same rate as the previous excursions about the stoichiometric mean, i.e., the same slope. As a result, the air/fuel ratio reaches stoichiometry after a time T' which is governed by the closed loop correction rate and the site of the air/fuel ratio error. A typical duration of the time T' is about 50 to 100 revolutions of the engine.

In contrast, with transient control in accordance with an embodiment of this invention, the instantaneous error upon the occurrence of the transient is substantially reduced and is only the difference between stoichiometry and point 2'. This rapid response reducing the air fuel ratio deviation is possible because air bypass valve 47 can rapidly adjust the amount of air to set the actual value of the air fuel ratio to the desired value of the air fuel ratio. As a result, modulation of the bypass air in accordance with an embodiment of this invention permits a more rapid return to a stoichiometric air fuel ratio even using the closed loop rate of change of air fuel ratio.

Figure 5:
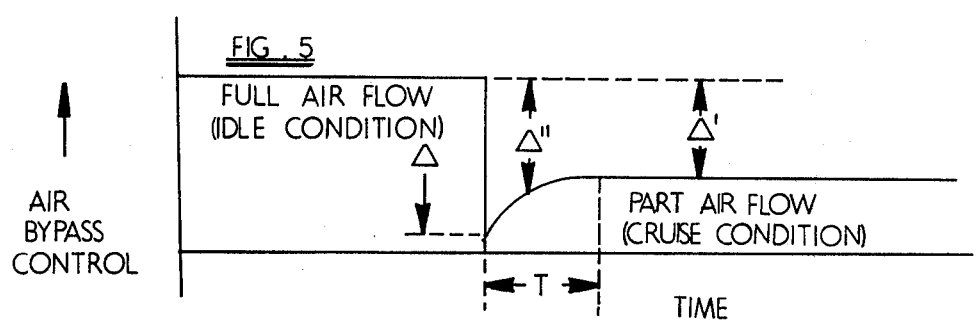
FIG. 5 is a graphical representation of the air flow versus time through the air bypass solenoid valve during different engine operating conditions so as to prepare the air flow through the air bypass valve for a predicted transient.

In operation, the air bypass system is prepositioned anticipating the next transient to act upon the steady state established by basic air fuel control system 10. For example, when in the idle mode, the air bypass air flow is fully turned on so as to be ready to be shut off under a sudden acceleration (FIG. 5). This shut-off action would create a richer condition at a time when generally lean engine operation develops. When in a heavy cruise mode, the air bypass air flow is shut off completely creating an ability to turn additional air on when needed (FIG. 5). This feature could be used to counter the normal rich condition arising during decelerations. For part throttle steady state operation, the air bypass valve is positioned near mid-range so as to be able to compensate in either direction. The use of air control is advantageous compared to the control of fuel flow due to the increase speed of response offered by the air-bypass type systems.

Figure 6A:
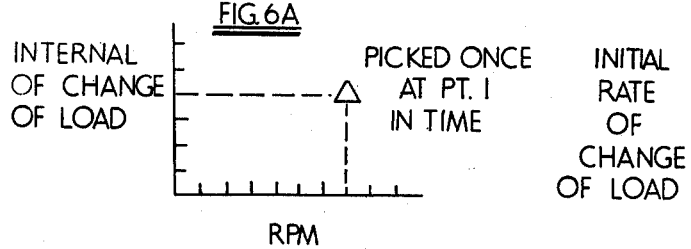
FIG. 6A is a representation of an adaptively updated table of values of the magnitude of the change in air flow through the air bypass valve upon detection of a transient, the table having coordinates of RPM versus the initial rate of change of load.
Figure 6B:
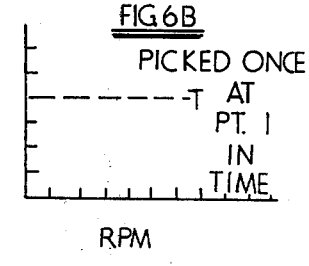
FIG. 6B is a representation of an adaptively updated table of valves of the length of time the air flow through the air bypass valve takes to return to steady state after a transient, the table having coordinates of RPM versus the initial rate of change of load.
Figure 6C:
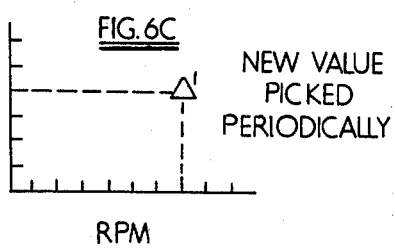
FIG. 6C is a representation of a table of values of the magnitude of the expected compensation to be provided by the air bypass valve upon detection of a transient, the table having coordinates of RPM versus load.

As shown in FIG. 6A, the amount of change in the air-bypass air flow is based on values in a table as a function of engine speed and rate of change of load. When a transient is detected, that is, a minimum value of the rate of change of load, at a specific engine speed, the air flow control provided by the air bypass system is changed by an amount $\Delta$ represented by the table value. This change would then be decreased with time to a new value, $\Delta$, anticipating the next transient, depending on the steady state value of engine speed and load. The new value is chosen from the table represented in FIG. 6C which is derived from a study of the most likely change to occur at a given RPM and load. Both the amount of instantaneous air flow change (FIG. 6A) as well as the time constant associated with its decay (FIG. 6B) would be obtained from adaptively updated tables on engine speed and the rate of change of load, or similar engine transient tracking parameters. Depending on the sign of the rate of change of load, the value in the table would represent an opening of the valve for decelerations and a closing of the valve for accelerations.

The process of adaptively updating these tables is carried out as follows. The exhaust gas oxygen sensor signal is sampled at predetermined intervals, small compared to the duration of the transient, and is statistically analyzed. Based on a statistical result, that is, for example, 30 rich indications versus 70 lean indications during a given time period, the values in the two tables (FIGS. 6A and 6B) are incremented or decremented producing a richer or leaner average control for the next transient. Once the statistical result of the exhaust gas oxygen sensor indications reaches 50 rich/50 lean indications, within some tolerance band, no further modifications are generated. However, each transient is monitored to check the validity of the table values.

The instantaneous amount of air flow, $\Delta''$, through air bypass valve 47 can be computed as follows:

$$\Delta''(t) = (A)(\Delta')(t/T) - (B)(\Delta)(1 - t/T)$$

Wherein
- t—is a measure of real elapsed time since the initiation of transient;
- T—is the time constant associated with the air fuel transient during which control through the bypass valve is required;
- Δ—is the initial magnitude of change in air flow in response to a transient;
- Δ'—is the desired air flow through the air bypass valve as a function of engine RPM and load so as to preposition the bypass valve so a transient can be effectively counteracted next time;
- A,B—constants picked to achieve a desired transition rate in the magnitude of the air flow supplied by the air bypass valve during the transient lasting time, T;

In accordance with the above formula, if the air fuel ratio during the early part of the transient is too rich, the amount of air flow, Δ, through the bypass valve is increased. If the air fuel ratio is too lean, air flow Δ is decreased. Analogously, if the air fuel ratio during the latter part of the transient is too rich, the duration T of time is decreased so that the amount of air passed can increase rapidly. On the other hand, if the air fuel ratio is too lean, the duration T of time is increased so that a decreased bypass air flow is maintained for a longer period of time.

The benefits which such a strategy offers include improved fuel economy in driving conditions ranging from city to highway, improved catalyst performance, improved emission control system integrity and operation and a reduction in reliance on the catalyst through better transient air fuel ratio control. The reduction on the catalyst is particularly advantageous because it reduces the catalyst size, volume and the need for precious metal in the catalyst thus reducing cost.

Having thus described a preferred embodiment of my invention, what I claim and desire to secure by U.S. Letters Patent is:

1. A method for controlling the air-fuel ratio for an internal combustion engine having an air supply passage by prepositioning an auxiliary air supply passage so the auxiliary air supply passage can be controlled to counteract a predicted transient, said method comprising:
   - generating a stored look-up table to govern the amount of change in the auxiliary air supply passage upon detection of a transient;
   - detecting a transient;
   - altering the amount of air flow in the auxiliary air supply passage as a function of the look-up table to maintain a desired air-fuel ratio;
   - adjusting the air flow in the auxiliary air supply passage to a value suitable for compensating for the next transient;
   - adaptively updating the table to take into account engine operation conditions by:
     - (a) sensing an exhaust gas oxygen sensor signal at predetermined intervals;
     - (b) modifying table values to provide a richer air-fuel average if there are a predetermined number of lean exhaust gas oxygen sensor indications;
     - (c) modifying table values to provide a leaner air-fuel average if there are a predetermined number of rich exhaust gas oxygen sensor indications; and
     - (d) producing no modification of the tables if the number of rich and lean indications are within a predetermined number of each other, so that said step of adjusting the air flow includes:
       - shutting off the auxiliary air passage when the engine is in a heavy cruise mode thereby creating the ability to turn on additional air when needed;
       - turning on the auxiliary air passage when the engine is in the idle mode so the auxiliary air passage is ready to be shut off under a sudden acceleration;
       - partly closing off the auxiliary air passage at part throttle steady state operation so as to be able to compensate in either direction; and
       - wherein the step of detecting a transient includes the step of detecting a minimum value of the rate of change of load at a given engine speed.

2. A fuel metering system for an internal combustion engine, the engine having a passage through which a mixture of air and fuel is introduced into a compression chamber of the engine, the fuel metering system comprising:
   - a fuel system for controlling the rate at which fuel is metered into the engine's intake passage;
   - a secondary path for injecting air into the combustion chamber of the engine and means for modifying the rate at which air passes through the secondary path and to preposition said secondary path to compensate for otherwise rapid changes in the air fuel ratio, said means for modifying the rate at which air is injected by the secondary path including a calculation means to calculate repetitively a value representing a current transfer rate of air through the main passage, a desired air fuel ratio, and an amount of air needed from the secondary path, so that said means for modifying the rate at which air is injected by the secondary path prepositions and said secondary path to be able to counteract a predicted transient;
   - said calculation means including:
     - stored look-up tables which are adaptively adjusted to provide settings of the ability of the secondary path to pass air, the adaptive adjustment taking place as a function of engine operating conditions;
     - a computation means for determining a desired steady state valve position to set the ability of the secondary path to pass air, said computation means receiving as input information an engine load indicating parameter;
     - a statistical analysis means to analyze an input from an exhaust gas oxygen sensor samplings to update time and amplitude look-up tables governing the change in valve position to set the ability of the secondary path to pass air, said statistical analysis means receiving input information of exhaust gas oxygen sensor sampling and the rate of change of manifold pressure;
     - memory table means coupled to said statistical analysis means for storing valve activation times during transient as a function of engine parameters;
     - a secondary memory table means of valve opening and closing commands as a function of engine parameters, said keep-alive second memory table being coupled to said statistical analysis means; and
     - a second computation means for calculating the instantaneous valve position, said calculation means being coupled to receive engine speed, manifold absolute pressure, rate of change of manifold pressure, information from said second keep-alive memory table means and information from second computation means of desired steadty state valve position, and having an output coupled to the valve setting ability secondary path to said air.

* * * * *